United States Patent
Braganca et al.

(10) Patent No.: US 9,373,344 B2
(45) Date of Patent: Jun. 21, 2016

(54) TWO SIDE BY SIDE MIMO READ SENSORS FABRICATED BY SELF-ALIGNED PROCESSING

(71) Applicant: HGST Netherlands B.V., Amsterdam (NL)

(72) Inventors: Patrick M. Braganca, San Jose, CA (US); Jordan A. Katine, Mountain View, CA (US); Neil L. Robertson, Palo Alto, CA (US); Howard G. Zolla, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 41 days.

(21) Appl. No.: 14/254,828

(22) Filed: Apr. 16, 2014

(65) Prior Publication Data

US 2015/0302873 A1  Oct. 22, 2015

(51) Int. Cl.
*H01L 29/82* (2006.01)
*G11B 5/39* (2006.01)

(52) U.S. Cl.
CPC ............ *G11B 5/3954* (2013.01); *G11B 5/3909* (2013.01)

(58) Field of Classification Search
None
See application file for complete search history.

(56) References Cited

U.S. PATENT DOCUMENTS

| | | | |
|---|---|---|---|
| 5,079,831 A | 1/1992 | Reid | |
| 5,309,305 A | 5/1994 | Nepela et al. | |
| 5,696,654 A | 12/1997 | Gill et al. | |
| 5,721,008 A | 2/1998 | Huang et al. | |
| 5,766,780 A | 6/1998 | Huang et al. | |
| 5,783,460 A | 7/1998 | Han et al. | |
| 5,784,772 A | 7/1998 | Ewasko et al. | |
| 6,204,071 B1 | 3/2001 | Ju et al. | |

OTHER PUBLICATIONS

Guzman, et al. "Design and Fabrication of Unshielded Dual-Element Horizontal MR Heads"; IEEE Transactions on Magnetics; vol. 30, No. 6; Nov. 1994; 3 pages.

*Primary Examiner* — Sonya D McCall Shepard
(74) *Attorney, Agent, or Firm* — Patterson & Sheridan, LLP

(57) ABSTRACT

The present invention generally relates to a read head in a magnetic recording head. The read head has side-by-side sensors that are formed of the same width by initially forming a single sensor and then removing selected portions of either the pinned or free magnetic layer of the sensor. Then, insulating material is filled into the area from where the selected portions have been removed. A hardmask may be necessary to properly define the side-by-side sensors to ensure that the selected portions of either the pinned or free magnetic layer are removed. The hardmask may be formed by blanket depositing hardmask material and then selectively removing the hardmask material such that the remaining hardmask material is equal to the width of the side-by-side sensors.

20 Claims, 21 Drawing Sheets

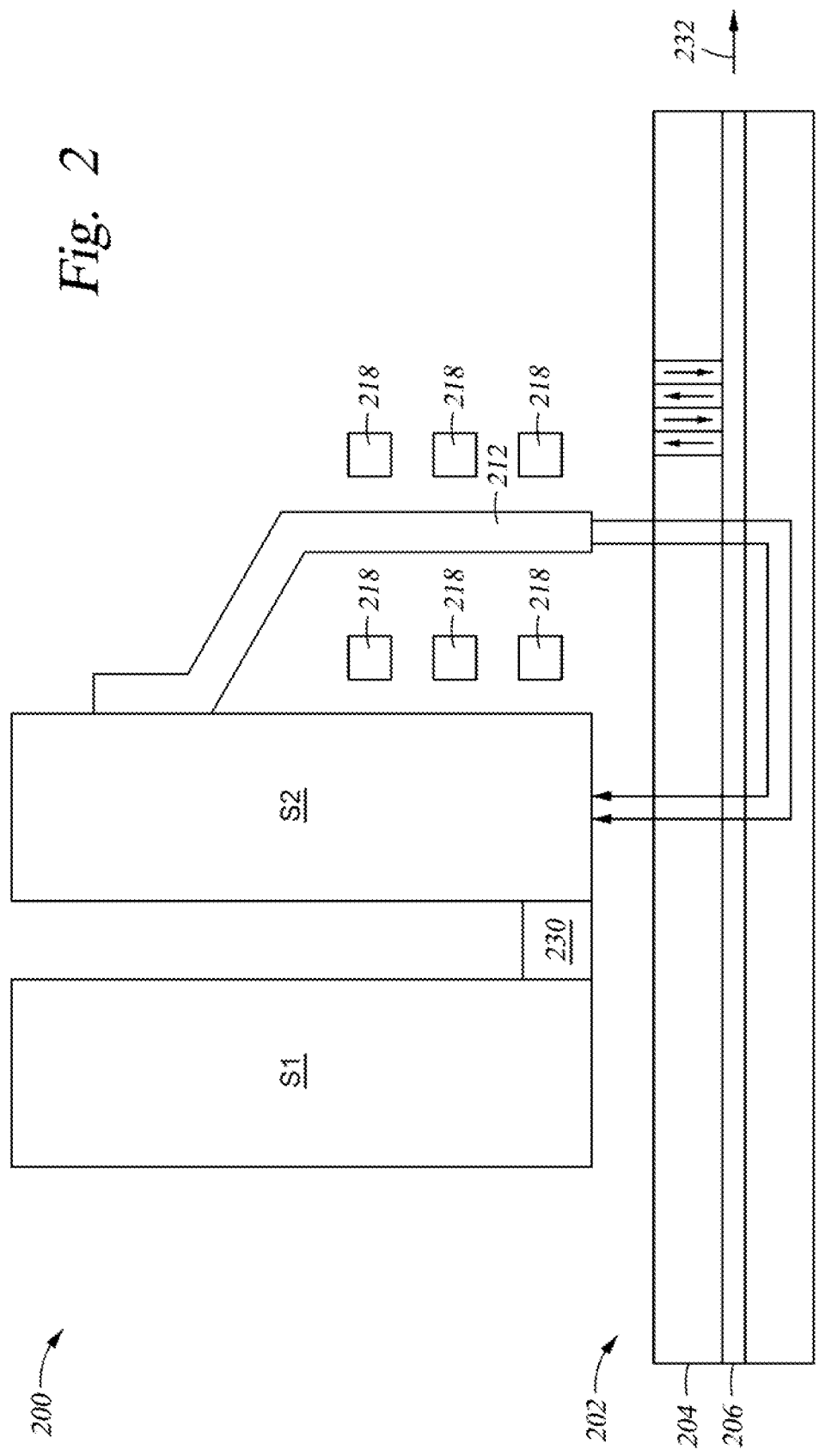

TWO SIDE BY SIDE MIMO READ SENSORS FABRICATED BY SELF-ALIGNED PROCESSING

BACKGROUND OF THE INVENTION

1. Field of the Invention

Embodiments disclosed herein generally relate to a magnetic read head for use in a hard disk drive.

2. Description of the Related Art

The heart of a computer is a magnetic disk drive which typically includes a rotating magnetic disk, a slider that has read and write heads, a suspension arm both above and below the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent to the media facing surface (MFS), such as an air bearing surface (ABS), of the slider causing the slider to ride on an air bearing a slight distance from the surface of the rotating disk. When the slider rides on the air bearing, the write and read heads are employed for writing and reading magnetic transitions corresponding to host data. The read and write heads are connected to a signal processing circuitry that operates according to a computer program to implement the writing and reading functions.

As written tracks and read heads narrow, read heads become more challenging to fabricate and performance of the heads degrades. One recording system level approach to relaxing the narrow reader and thin read gap requirement is the use of multiple sensors to decode data on the disk. Multiple sensors are a part of an emerging technology called multiple in, multiple out (MIMO) recording systems whereby rather than a single read sensor, multiple sensors are used to improve areal density. The multiple in, multiple out (MIMO) recording system design utilizes multiple read heads to decode the data recorded on the disk.

The MIMO concept typically uses a read head having multiple read sensors to improve the overall performance of the recording system. One type of MIMO system utilizes symmetric side-by-side read sensors, separated by a narrow gap. The side-by-side readers can be used with a Chevron type system as well whereby a third sensor is also present either above or below the side-by-side sensors. If the gap separating the side-by-side sensors is not necessarily centered between them, there is a dramatic impact on the system performance if the misalignment becomes too large (e.g., >10 nm).

Therefore, there is a need in the art for an improved MIMO read head having side-by-side sensors that are properly aligned.

SUMMARY OF THE INVENTION

The embodiments disclosed generally relate to a read sensor in a magnetic recording head. The read head has side-by-side sensors that are formed of the same width by initially forming a single sensor and then removing selected portions of either the free magnetic layer or the pinned and free magnetic layer of the sensor. Then, insulating material is filled into the area from where the selected portions have been removed. A hardmask may be necessary to properly define the side-by-side sensors to ensure that the selected portions of either the pinned or free magnetic layer are removed. The hardmask may be formed by blanket depositing hardmask material and then selectively removing the hardmask material such that the remaining hardmask material is equal to the width of the side-by-side sensors.

In one embodiment, a method of making a magnetic read head having side-by-side MIMO read sensors comprises forming a sensor above a bottom shield, wherein the sensor comprises an oxide barrier layer between two magnetic layers; forming a mandrel over the sensor; depositing a spacer layer over the mandrel and sensor; reactive ion etching or ion milling the spacer layer; removing the mandrel to expose the sensor; and milling the sensor to expose the oxide barrier layer and form side-by-side sensors.

In another embodiment, a method of making a magnetic read head having side-by-side MIMO read sensors comprises forming a first photomask over a first hardmask layer, an image transfer layer and a DLC layer; reactive ion etching the photomask and first hardmask layer to expose the image transfer layer; reactive ion etching the exposed image transfer layer to expose the DLC layer, wherein the reactive ion etching removes the first photomask; depositing a second hardmask layer over the exposed DLC layer and the first hardmask layer; ion milling the second hardmask layer, wherein the ion milling exposes the first hardmask layer and a portion of the DLC layer; and removing the first hardmask layer and the image transfer layer.

In another embodiment, a method of making a magnetic read head having side-by-side MIMO read sensors comprises forming a first photomask over a first hardmask layer and a DLC layer; depositing a second hardmask layer over the first hardmask layer and the first photomask; reactive ion etching the second hardmask layer to expose the first hardmask layer and the first photomask; removing the first photomask; and reactive ion etching the second hardmask layer and the exposed first hardmask layer to expose the DLC layer and expose the first hardmask layer underlying the second hardmask layer.

In another embodiment, a method of making a magnetic read head having side-by-side MIMO read sensors comprises forming a hardmask over a DLC layer, a top lead layer, a sensor and a bottom shield, wherein a first portion of the DLC layer is exposed; forming a first photomask over the hardmask and the DLC layer such that a second portion of the DLC layer remains exposed; removing the second portion of the DLC layer and the top lead layer and sensor underlying the second portion of the DLC layer to expose the bottom shield; depositing a second photomask over the bottom shield and a third exposed portion of the DLC layer, wherein a fourth portion of the DLC layer is exposed between the hardmask; and removing the fourth portion of the DLC layer, the top lead layer underlying the fourth portion of the DLC layer, and a portion of the sensor to expose an oxide barrier layer, wherein removing a portion of the sensor creates side-by-side read sensors.

In another embodiment, a MIMO read head comprises a bottom shield; a top shield; and side-by-side sensors disposed between the bottom shield and the top shield, wherein the side by side sensors share a first magnetic layer that is disposed on the bottom shield and an oxide barrier layer disposed on the first magnetic layer, wherein each side-by-side sensor comprises a second magnetic layer disposed on the oxide barrier layer, wherein each second magnetic layer have substantially identical dimensions. In certain embodiments, the MIMO read head may be used in a recording system or a hard disk drive.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a side view of a read/write head and magnetic disk of the disk drive of FIG. 1, according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a read head in a magnetic recording head. The read head has side-by-side sensors that are formed of the same width by initially forming a single sensor and then removing selected portions of either the free magnetic layer or the pinned magnetic layer and the free magnetic layer of the sensor. Then, insulating material is filled into the area from where the selected portions have been removed. A hardmask may be necessary to properly define the side-by-side sensors to ensure that the selected portions of either the pinned or free magnetic layer are removed. The hardmask may be formed by depositing hardmask material and then selectively removing the hardmask material such that the remaining hardmask material is equal to the width of the side-by-side sensors.

Figure 1:
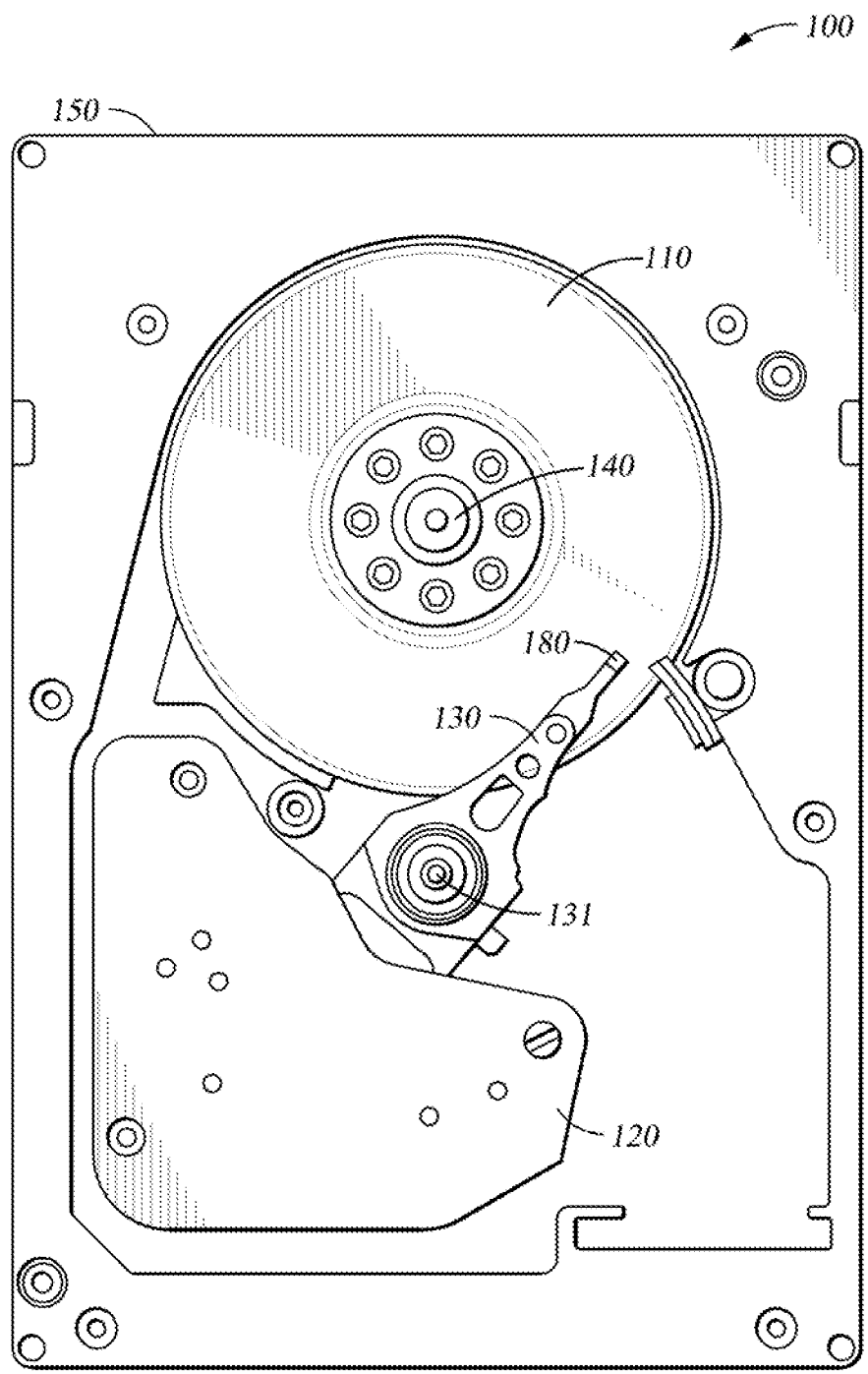
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks 110 may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track. It is to be understood that the actuator arm 130 may be configured to move in manners other than swiveling around actuator axis 131. The embodiments discussed herein are not to be limited to swiveling around an actuator axis.

FIG. 2 is a fragmented, cross-sectional side view through the center of a read/write head 200 facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206. The read/write head 200 includes an ABS, a magnetic write head and a magnetic read head, and is mounted such that its ABS is facing the magnetic disk 202. In FIG. 2, the disk 202 moves past the head 200 in the direction indicated by the arrow 232. The RL 204 is illustrated with perpendicularly recorded or magnetized regions, with adjacent regions having magnetization directions, as represented by the arrows located in the RL 204. The magnetic fields of the adjacent magnetized regions are detectable by the sensing element 230 as the recorded bits. The write head includes a magnetic circuit made up of a main pole 212 and a thin film coil 218 shown in the section embedded in non-magnetic material 219. It is to be understood that while the description has been made with reference to perpendicularly recorded regions, the embodiments disclosed herein are not limited to perpendicular magnetic recording. The embodiments disclosed herein are equally applicable to other magnetic recording possibilities as well.

As discussed herein, the read head includes a read sensor 230. In the embodiments herein, the read sensor 230 comprises multiple sensors. The multiple sensors may be arranged in a side-by-side head structure in which the two sensors sit side-by-side in a single read gap. Additionally, the multiple sensors may be used in a chevron read head structure whereby the side-by-side sensors have a third sensor positioned over or under the two side-by-side sensors. The resulting side-by-side sensors have trackwidth matching and sensor-to-sensor spacing control without the need for new and expensive lithography tools.

Figure 3A:
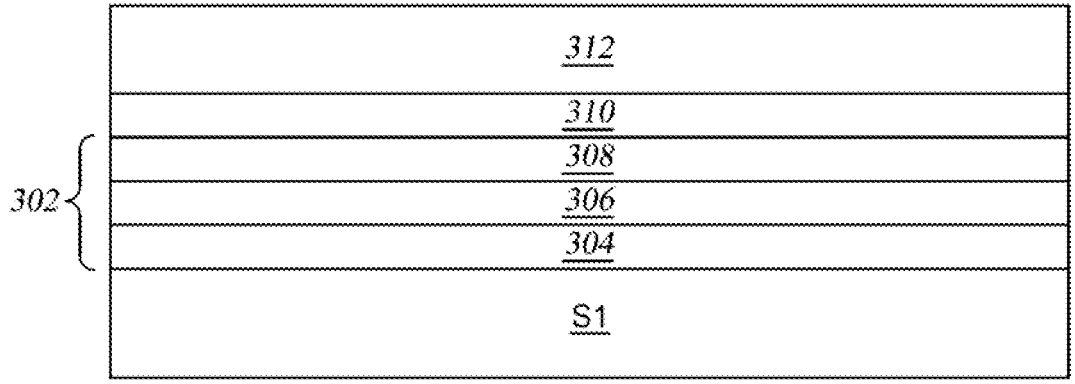
FIGS. 3A-3O illustrate a read head at various stages of manufacture according to one embodiment.
Figure 3B:
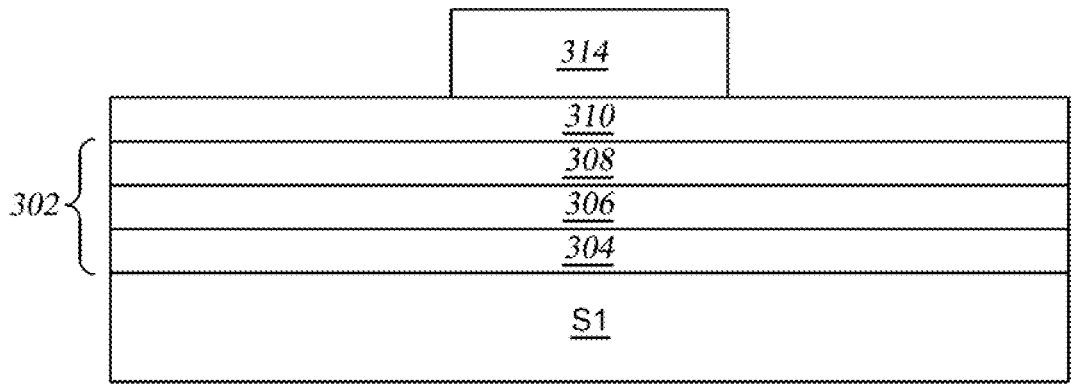
Figure 3C:
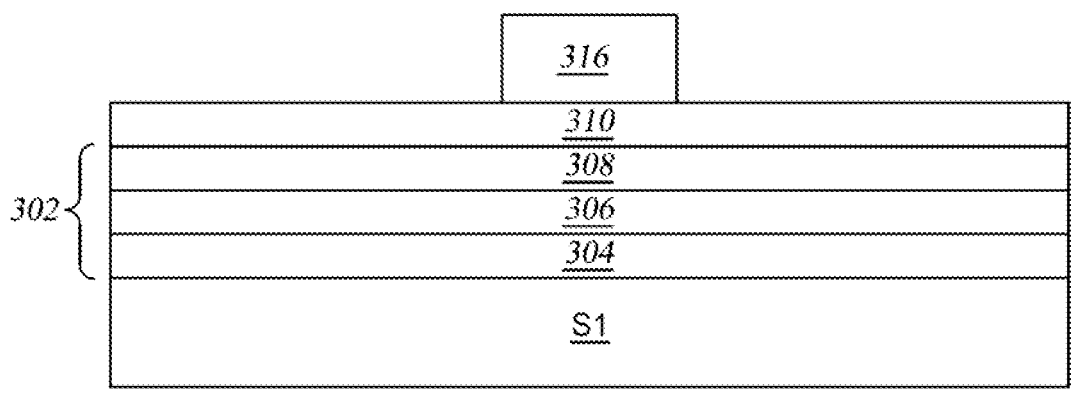
Figure 3D:
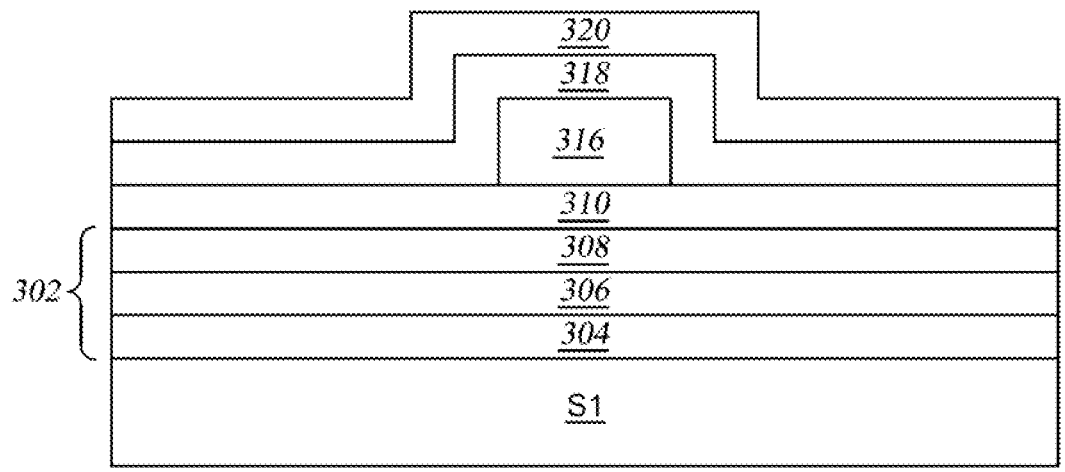
Figure 3E:
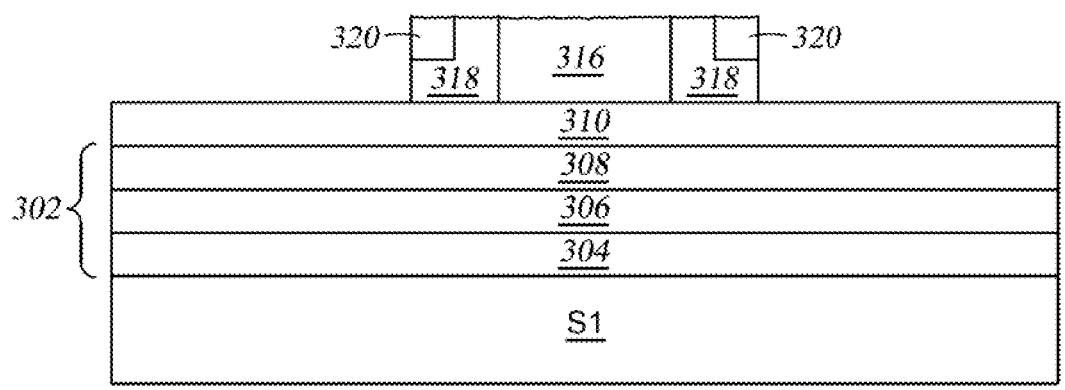
Figure 3F:
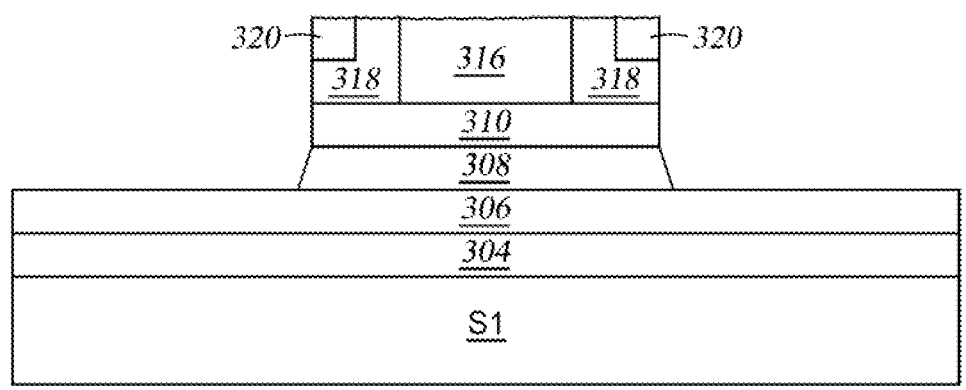
Figure 3G:
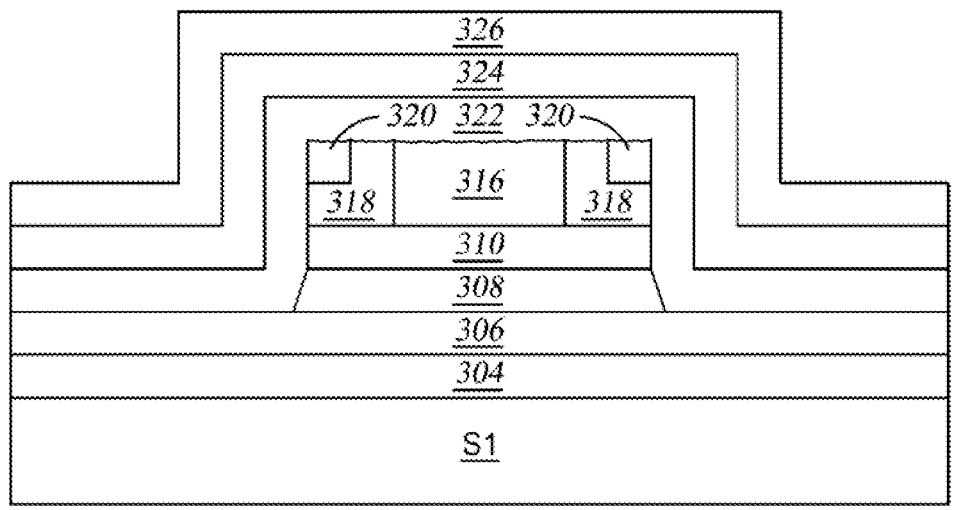
Figure 3H:
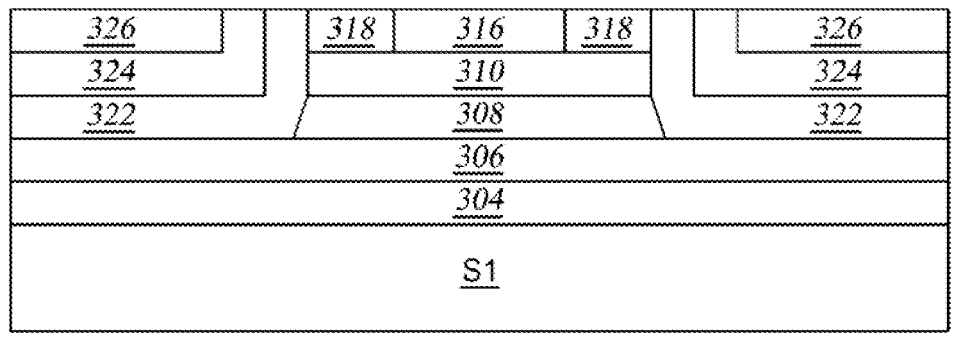
Figure 3I:
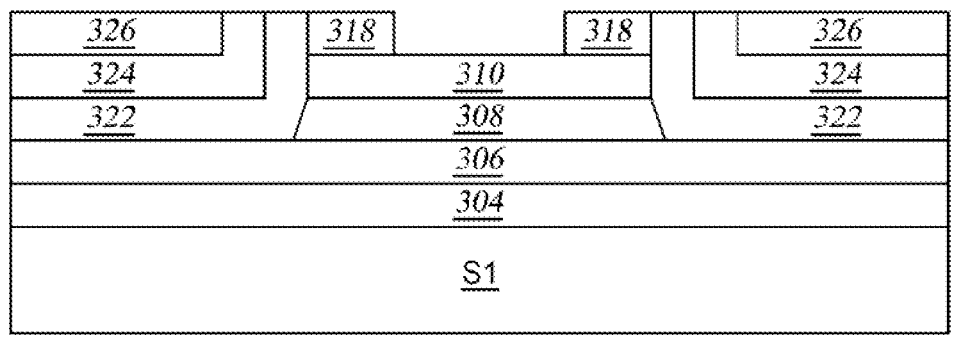
Figure 3J:
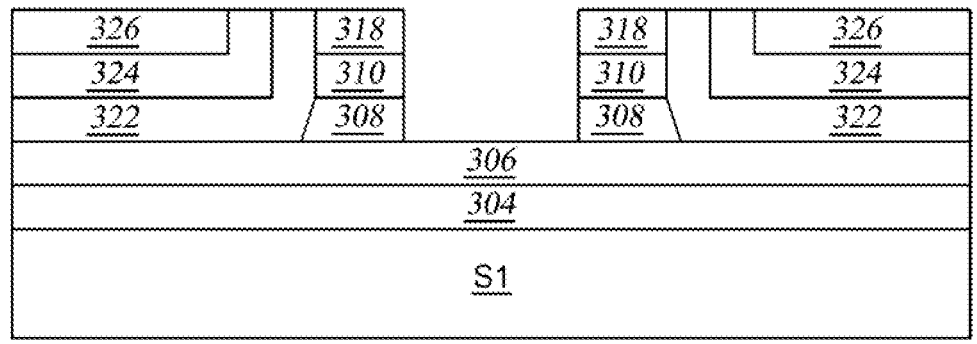
Figure 3K:
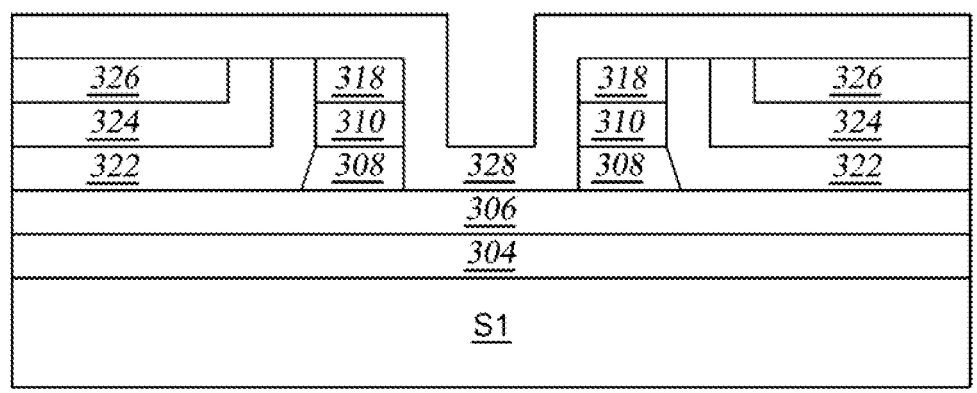
Figure 3L:
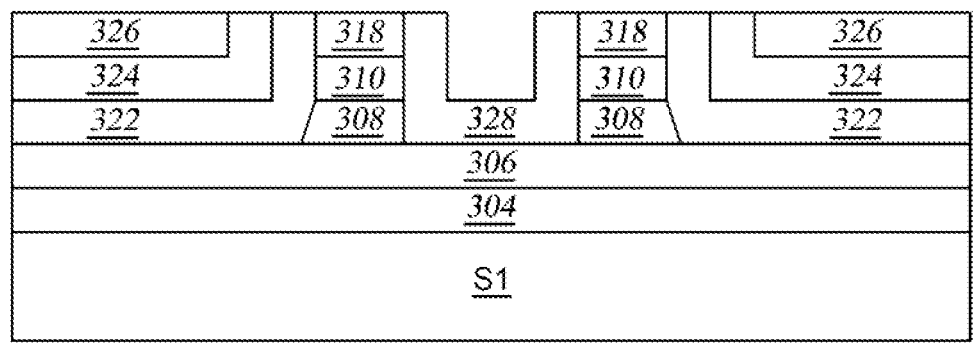
Figure 3M:
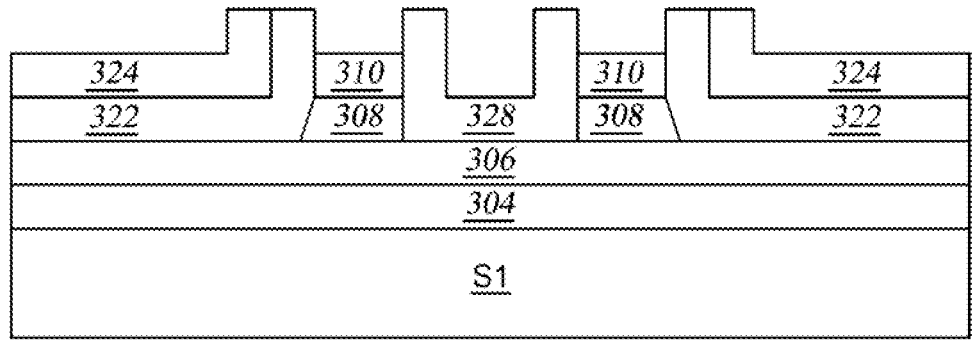
Figure 3N:
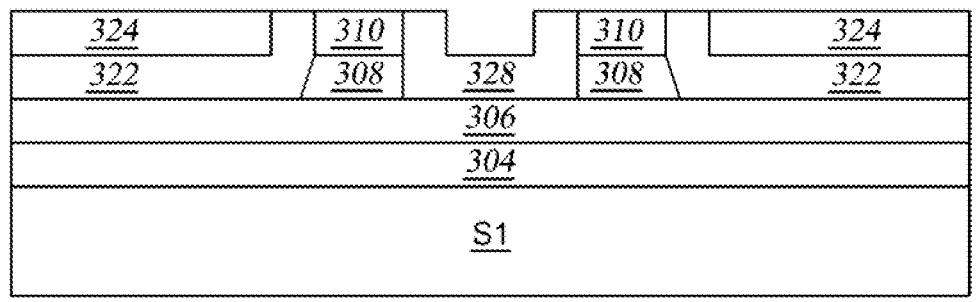
Figure 3O:
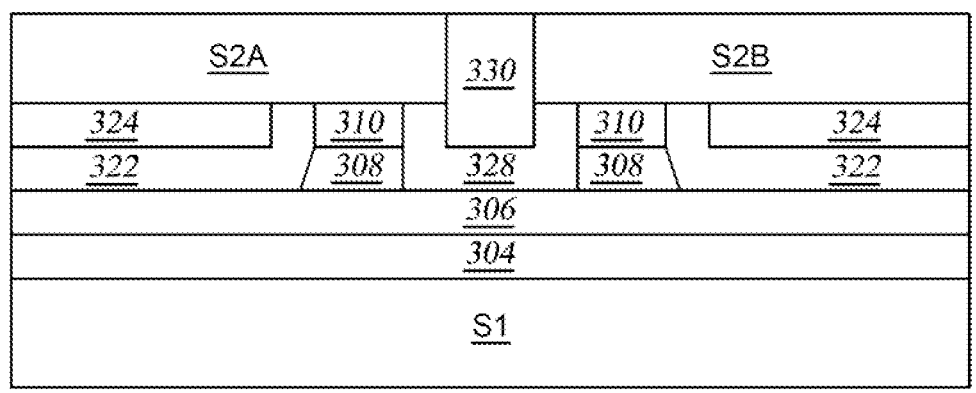

FIGS. 3A-3O illustrate a read head at various stages of manufacture according to one embodiment. As shown in FIG. 3A, a TMR sensor 302 is formed over a bottom shield S1. The TMR sensor 302 includes at least a pinned magnetic layer 304, an oxide barrier layer 306 and a free layer 308. While not shown, a seed layer may be present between the TMR sensor 302 and the bottom shield S1. The pinned magnetic layer 304 may comprise one of several types of pinned layers, such as a simple pinned, antiparallel pinned, self pinned or antiferromagnetic pinned sensor. For purposes of simplicity, the sensor will be described herein as a self pinned sensor having a pinned layer, a reference layer and a non magnetic layer, such as Ru sandwiched therebetween. The pinned, reference and free layers can be constructed of several magnetic materials such as, for example NiFe, CoFe, CoFeB, or diluted magnetic alloys. The pinned magnetic layer 304 may have a thickness of between about 10 Angstroms and about 100 Angstroms and be deposited by a thin film deposition process such as DC magnetron sputtering. Similarly, the reference layer may have a thickness of between about 10 Angstroms and about 100 Angstroms and be deposited by a thin film deposition process such as DC magnetron sputtering. The non magnetic layer may be referred to as an antiparallel coupling layer and have a thickness of between about 5 Angstroms and about 10 Angstroms. The non magnetic layer may comprise ruthenium and may be deposited by a thin film deposition process such as DC magnetron sputtering. The oxide barrier layer 306 comprises an insulating material such as MgO, $HfO_2$, $TiO_2$ or $Al_2O_3$. The oxide barrier layer 306 is the insulator between the free layer 308 and the pinned magnetic layer 304 and thus, functions as the tunnel barrier between the two magnetic layers.

A RIE stop layer 310 is formed on the TMR sensor 302. The RIE stop layer 310 may comprise silicon, $SiO_2$ or Ru, may be deposited by atomic layer deposition (ALD), chemical vapor deposition (CVD) or sputtering process, and may have a thickness of between about 10 Angstroms and about 200 Angstroms. A photoresist 312 is then formed on the RIE stop layer 310. The photoresist 312 is then patterned to form a mask 314 as shown in FIG. 3B. Following formation of the mask 314, the mask 314 is trimmed by a RIE process whereby the trimmed mask 316 is formed that will ultimately define the spacing between the side-by-side sensors as shown in FIG. 3C. The mask 314 trimming is optional. For example, rather than conventional photolithography to form the mask 314, immersion lithography or another capable technique may be used so that the desired final mask pattern can be directly formed without the need for subsequent trimming.

A spacer film 318, deposited by a deposition method such as ALD or ion beam sputtering, is then formed over the RIE stop layer 310 and the trimmed mask 314 as shown in FIG. 3D. The spacer film 318 may comprise an insulating material such as $SiO_2$, tantalum oxide, alumina or $TiO_2$. The spacer film 318 may have a thickness of between about 10 nm and about 75 nm. A milling stop layer 320, such as DLC, is then formed on the spacer film 318. It is contemplated that rather than utilizing a trimmed mask 316, a mandrel of an insulating material may be used with the milling stop layer 320 formed thereover. The milling stop layer 320 may have a thickness of between about 5 nm and about 75 nm and be deposited by sputtering or CVD.

The milling stop layer 320 and spacer film 318 are then anisotropically etched using a RIE process as shown in FIG. 3E, which exposes the RIE stop layer 310 and the trimmed mask 316. The exposed RIE stop layer 310 and the TMR sensor 302 are then milled as shown in FIG. 3F. It is to be understood that while shown to be milled to the oxide barrier layer 306, it is contemplated that the milling may occur all the way to the bottom shield S1. During the milling, the trimmed mask 316, spacer layer 318 and milling stop layer 320 are milled as well, but sufficient amounts of the trimmed mask 316, spacer layer 318 and milling stop layer 320 remain. The milling stop layer 320, spacer layer 318 and trimmed mask 316 collectively help define the TMR sensor 302 boundaries. The remaining spacer layer 318 defines the trackwidth of the side-by-side sensors being formed later.

An insulating layer 322, a hard or soft bias layer 324 and a CMP stop layer 326 are then deposited as shown in FIG. 3G. In one embodiment, the CMP stop layer 326 may comprise DLC. The insulating layer 322 may comprise an insulating material such as aluminum oxide or silicon nitride. The insulating layer 322 may be deposited by well known deposition methods such as ALD, CVD and ion beam sputtering (IBD). The magnetic bias layer 324 may comprise a single material or laminated magnetic materials such as CoPt, FePt, high moment CoFe or NiFe and may be deposited by sputtering.

Following formation of the CMP stop layer 326, the structure is then polished. The mechanical grinding of a CMP process will grind down the CMP stop layer 326 that is over the trimmed mask 316 so that the resulting structure has the CMP stop layer 326 substantially planar with the trimmed mask 316 as shown in FIG. 3H. As such, the milling stop layer 320 is completely removed and the CMP stop layer 326 is also substantially planar with the exposed spacer layer 318. Alternatives such as removal by wet chemical means may be a substitute or a precursor to any CMP polishing.

The trimmed mask 316 is then removed as shown in FIG. 3I. The trimmed mask 316 may be removed by a CMP process, a wet etching process, a RIE process or an ashing process such that the RIE stop layer 310 is exposed. The exposed RIE stop layer 310 is then milled as is the top layer of the TMR sensor 302 such that the oxide barrier layer 306 is exposed as shown in FIG. 3J. At this point, separate, side-by-side sensors have been fabricated.

An insulating layer 328 is then deposited over the structure as shown in FIG. 3K. The insulating layer 328 will be used to isolate the pinned magnetic layers 308 for the side-by-side sensors. The insulating layer 328 may comprise alumina and may be deposited by ALD, CVD or sputtering. The structure is then polished, such as by a CMP process, to the CMP stop layer 326 as shown in FIG. 3L so that the insulating layer 328 is polished and remains only adjacent the spacer layer 318, the RIE stop layer 310, the free layer 308 and on the oxide barrier layer 306.

The spacer layer 318 is then removed as shown in FIG. 3M to expose the RIE stop layer 310. Additionally, the CMP stop layer 326 is also removed to expose the bias layer 324. The removing may occur by RIE. A brief CMP process or low angle ion milling process is then performed to smooth out the structure as shown in FIG. 3N whereby the RIE stop layer 310 effectively acts as a CMP stop. Top contacts S2A, S2B, may then be formed with an insulating material 330 therebetween. The insulating material 330 ensures the side-by-side sensors are isolated from one another. The upper shields S2A, S2B are electrically conductive. The top contacts S2A, S2B function not only as electrical connection to the side-by-side sensors, but may also, in some embodiments, function as a magnetic shield to the sensors. The top contacts S2A, S2B may comprise magnetic material in some embodiments. In other embodiments, the top contacts S2A, S2B may comprise non-magnetic, electrically conductive material.

The resulting structure includes side-by-side TMR sensors where the trackwidth of the side-by-side sensors is substantially identical and obtained without the use of new, expensive photolithography tools. As noted above, while the pinned magnetic layer 304 has been shown and described as a single layer, it is contemplated that the pinned magnetic layer 304 may comprise a multilayer structure such as an antiferromagnetic layer, pinned magnetic layer, nonmagnetic spacer layer and reference magnetic layer, which collectively form a pinned structure. The materials were chosen, along with conventional commercially available photolithography processes, to take advantage of etch and milling properties such that the trackwidth can be defined. Additionally, it should be noted that while description has been made with reference to the pinned magnetic layer 304 being disposed on the bottom shield S1 and the free layer 308 being split to form the side-by-side sensors, it is contemplated that the pinned magnetic layer 304 could be the top layer and hence, split while the free layer 308 is on bottom shield S1 and intact.

Figure 4A:
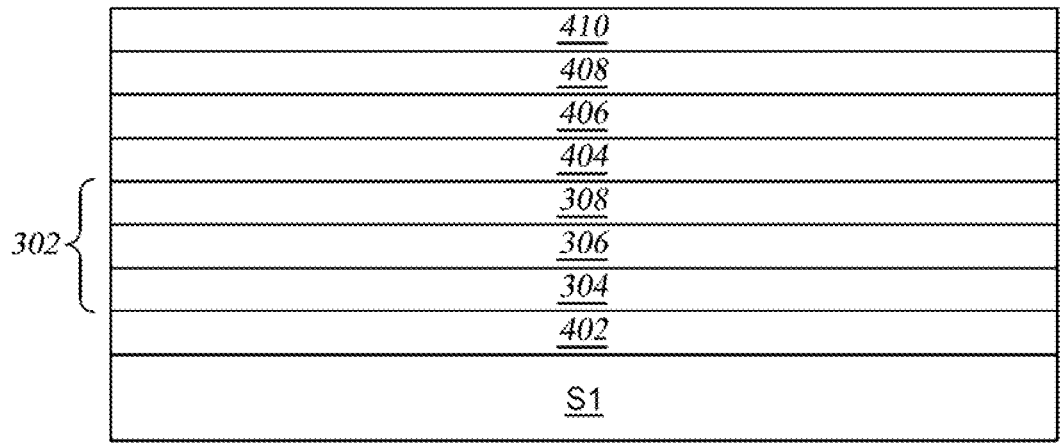
FIGS. 4A-4T illustrate a read head at various stages of manufacture according to another embodiment.
Figure 4B:
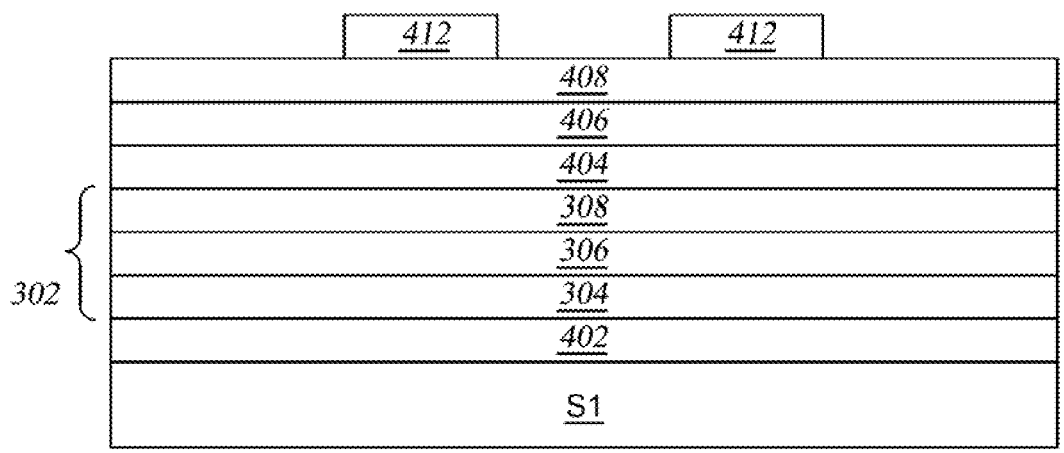
Figure 4C:
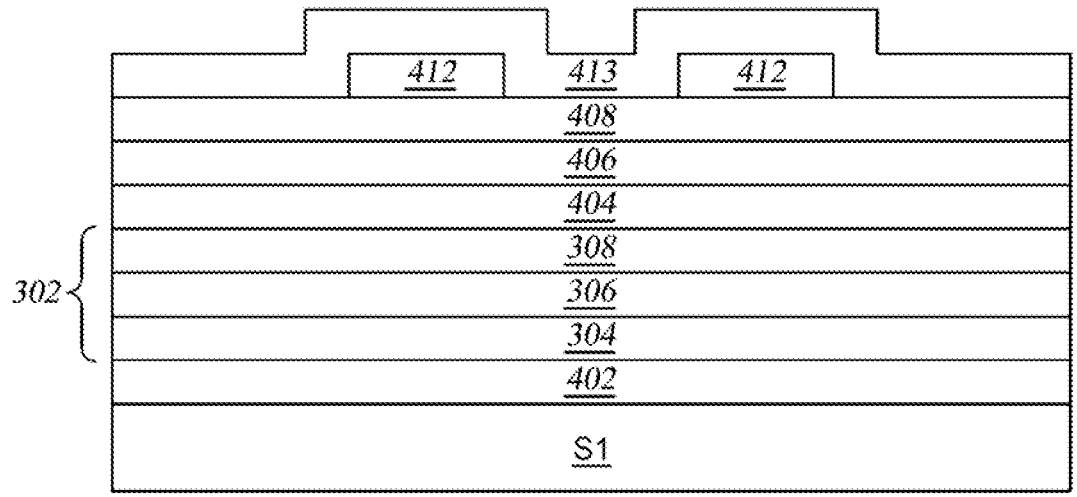
Figure 4D:
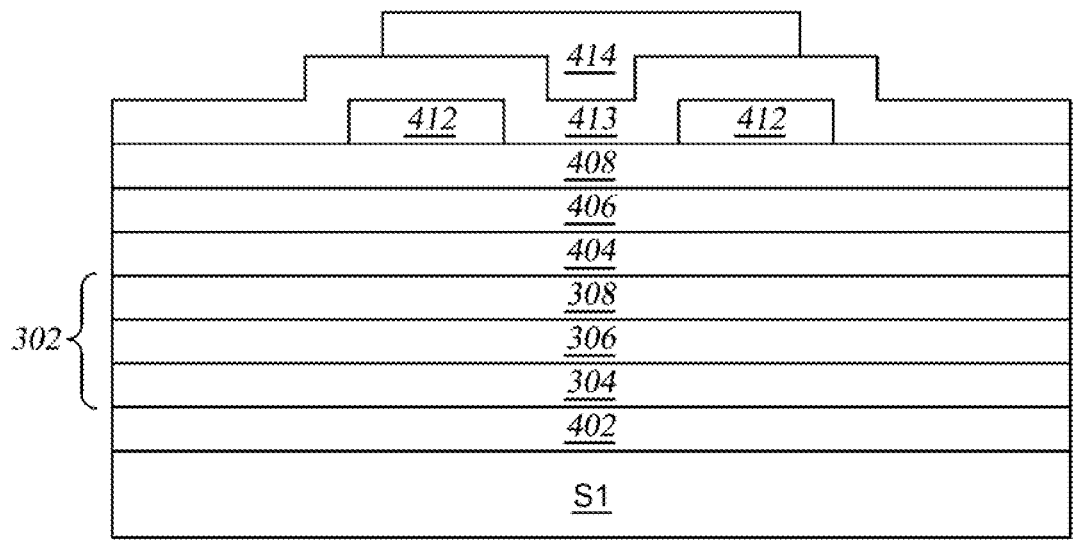
Figure 4E:
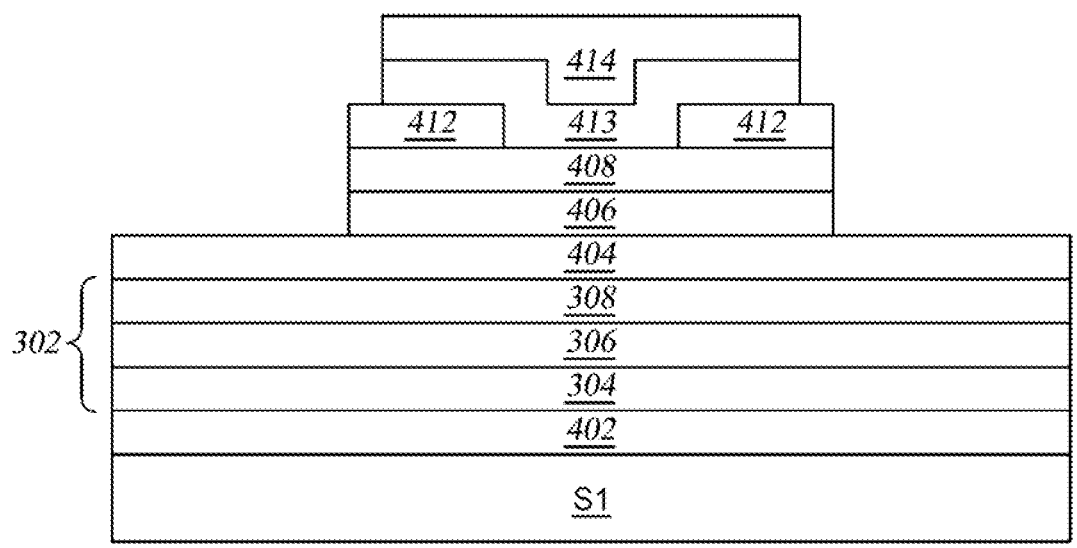
Figure 4F:
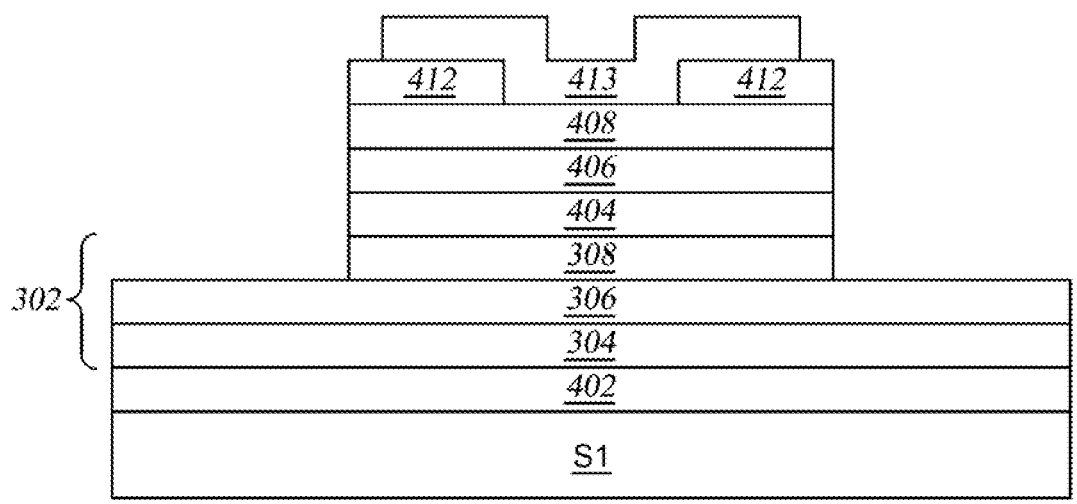
Figure 4G:
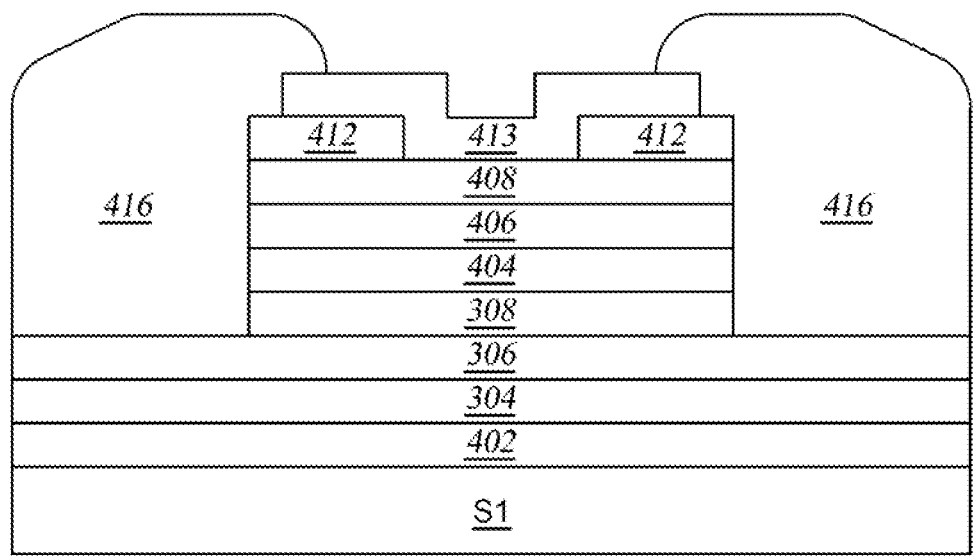
Figure 4H:
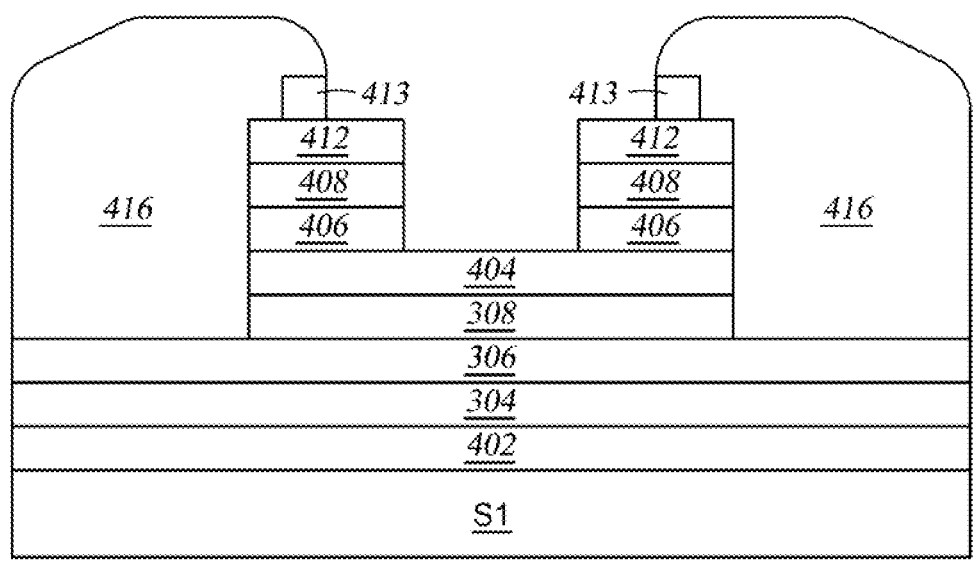
Figure 4I:
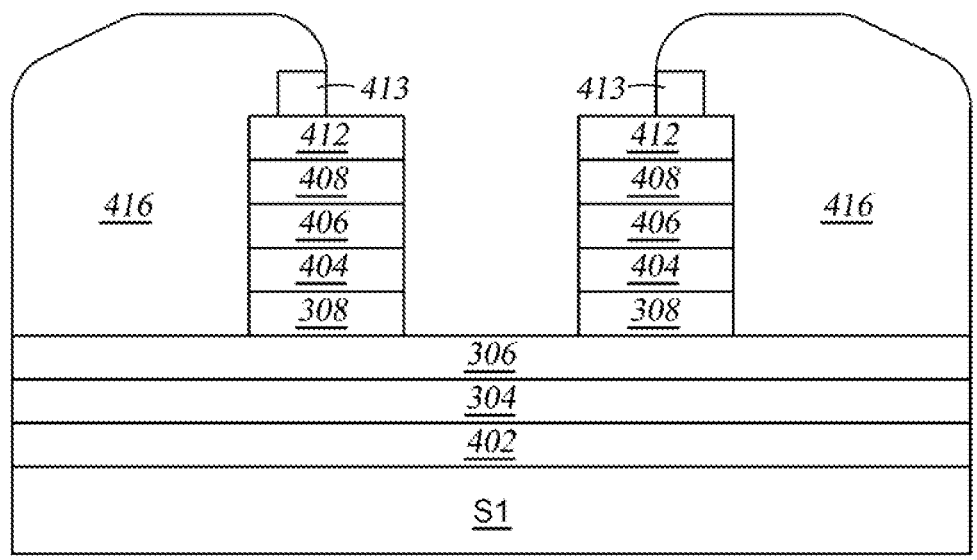
Figure 4J:
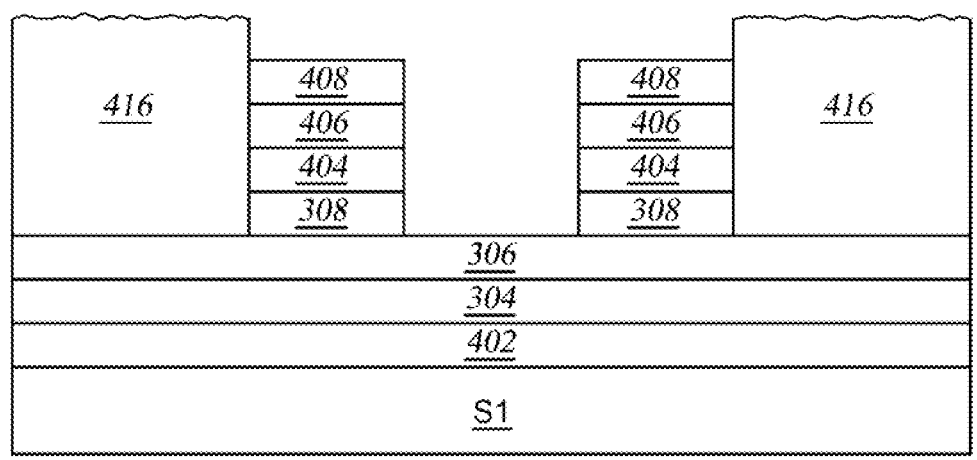
Figure 4K:
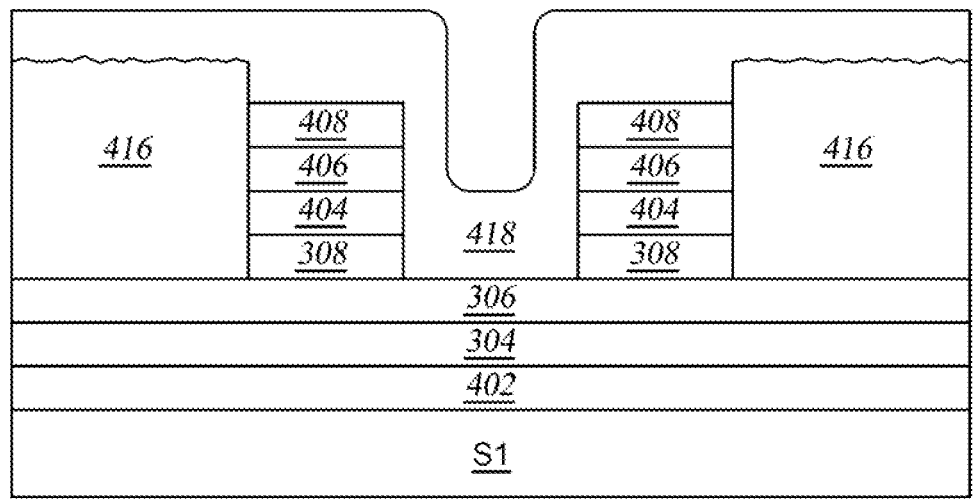
Figure 4L:
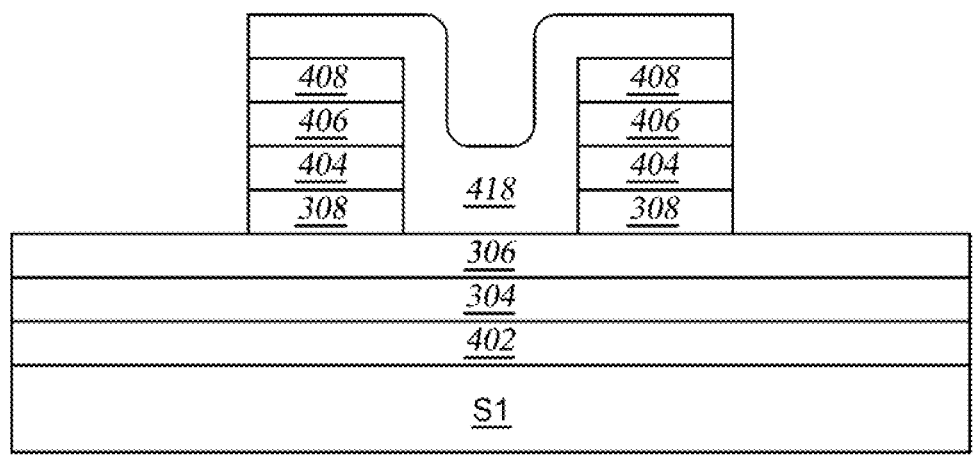
Figure 4M:
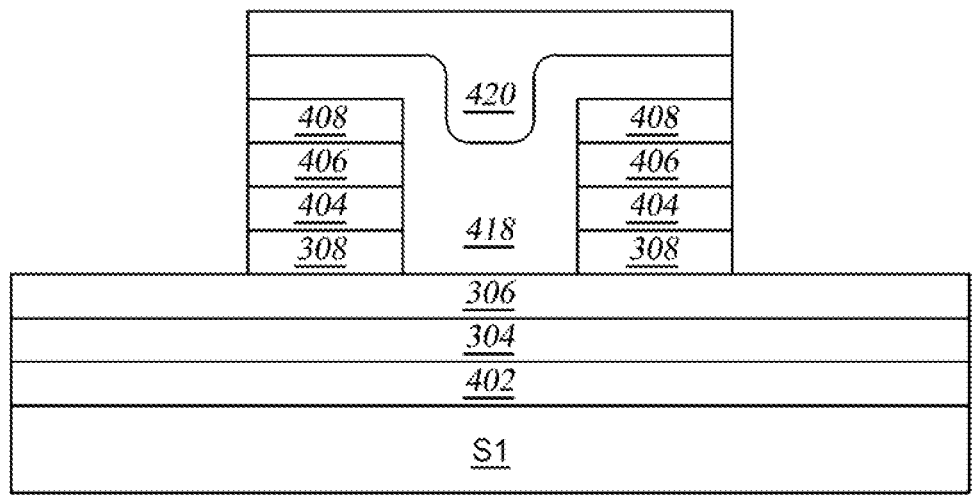
Figure 4N:
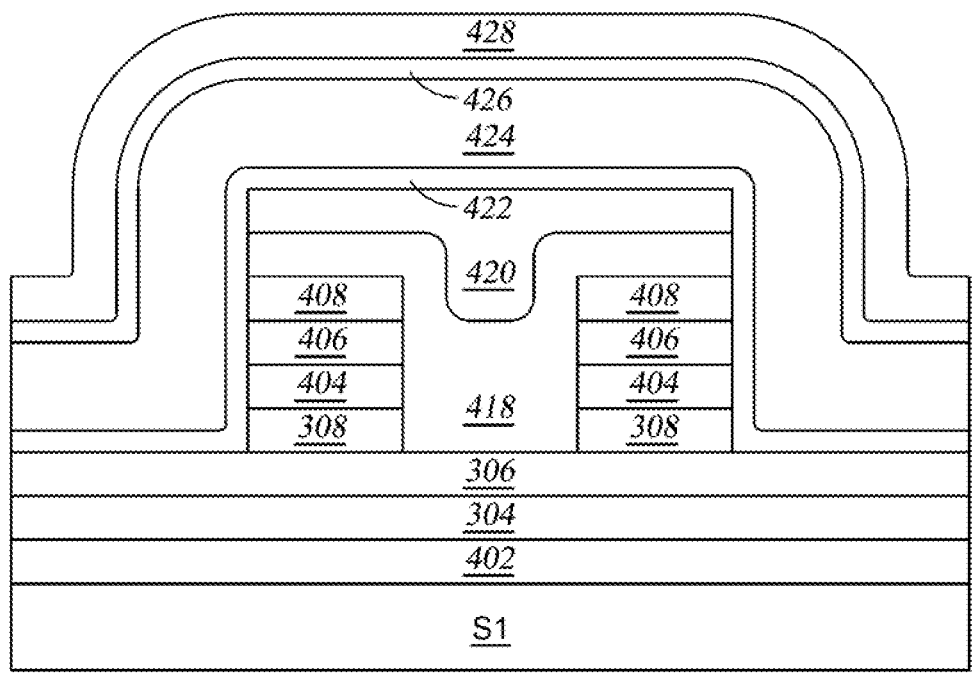
Figure 4O:
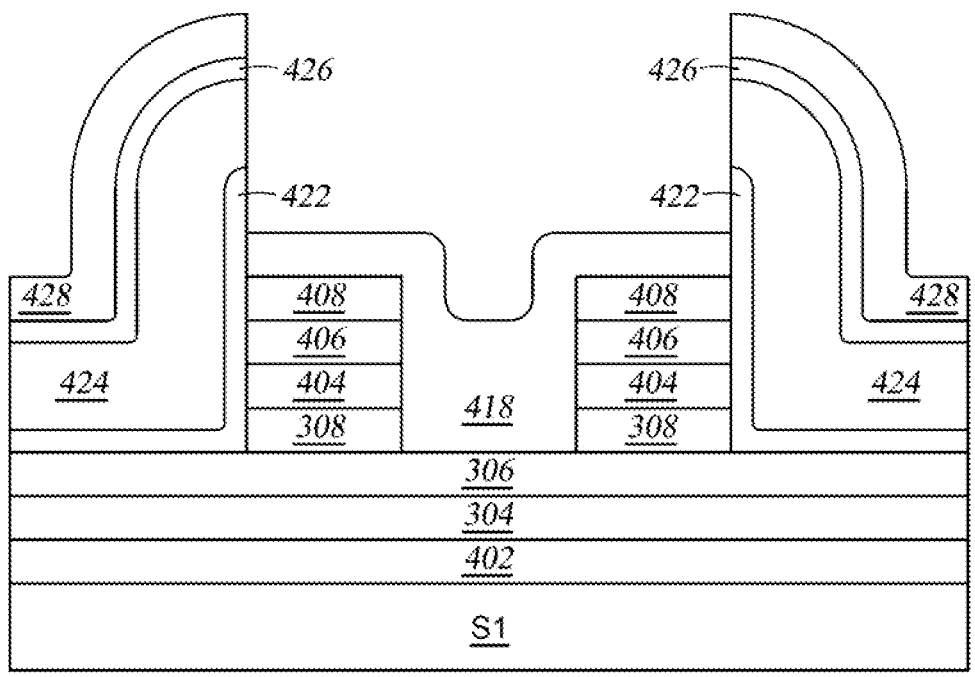
Figure 4P:
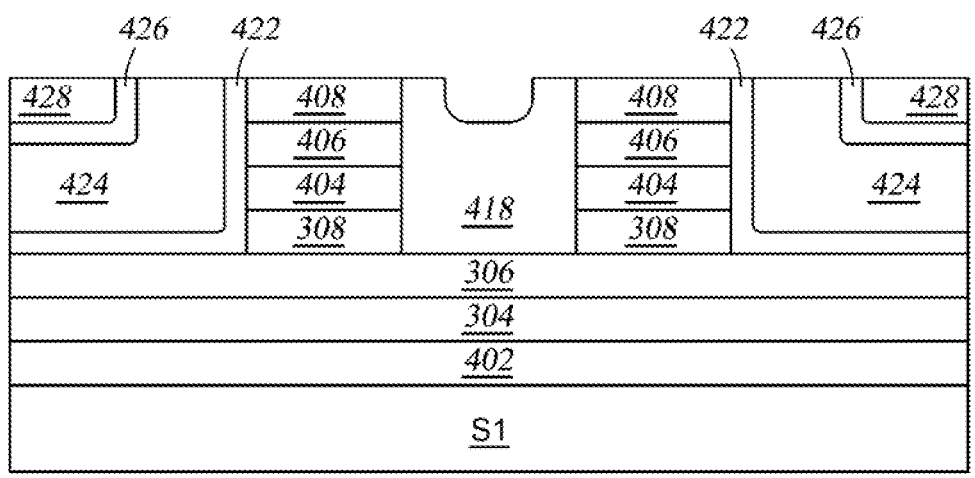
Figure 4Q:
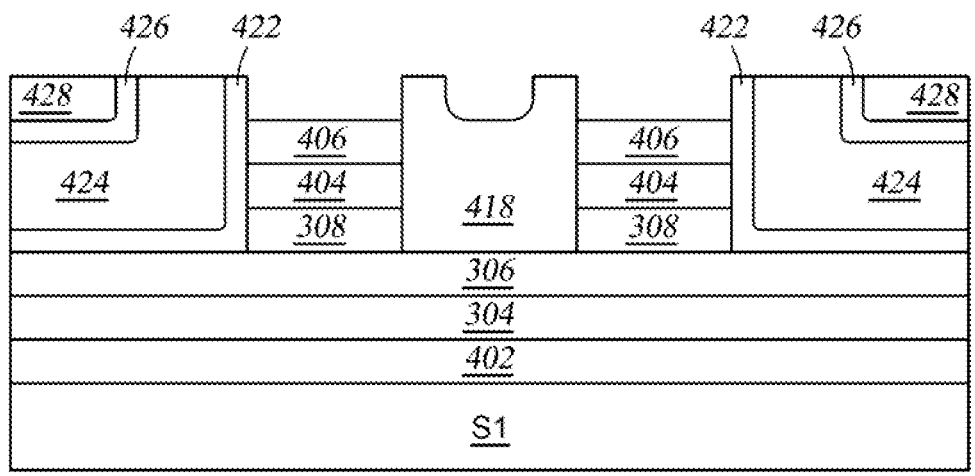
Figure 4R:
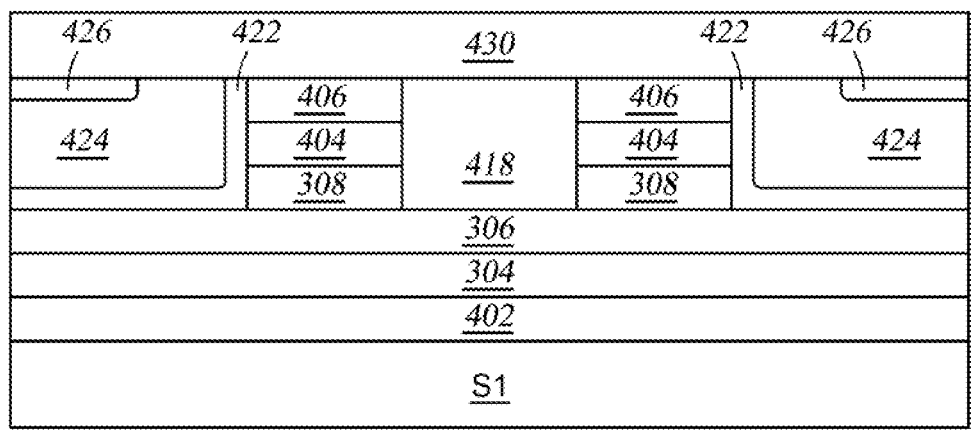
Figure 4S:
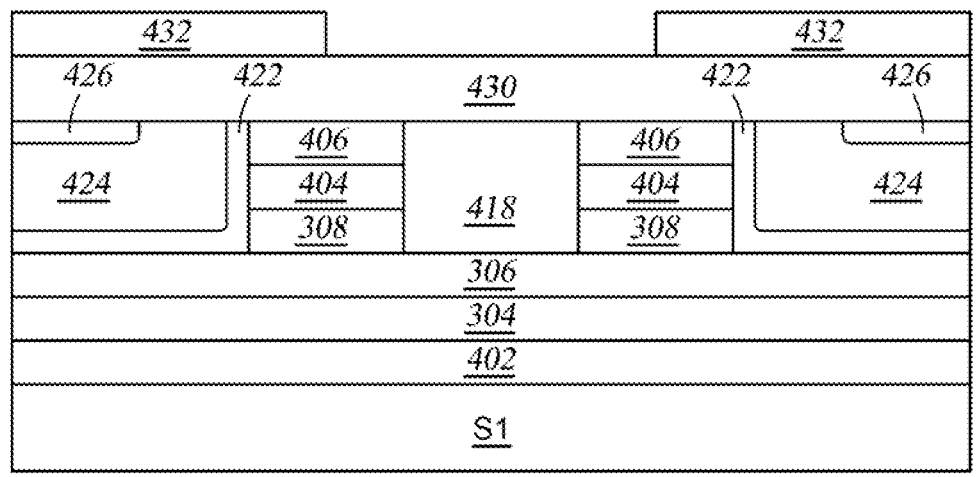

FIGS. 4A-4S illustrate a read head at various stages of manufacture according to another embodiment. As shown in FIG. 4A, a TMR sensor 302 is formed over a bottom shield S1. An optional seed layer 402 is disposed between the TMR sensor 302 and the bottom shield S1. The seed layer 402 may be deposited by a thin film deposition process such as DC magnetron sputtering. A capping layer 404 may be deposited on the TMR sensor 302. The capping layer 404 may comprise ruthenium or ferromagnetic materials such as Ni or nickel alloys and have a thickness of between about 2 nm and about 10 nm. The top lead 406 may then be deposited. The top lead 406 may comprise tungsten or tantalum and may be deposited by sputtering to a thickness of between about 10 nm and about 50 nm. A DLC layer 408 is then deposited. Finally, a hardmask layer 410 may be deposited on the DLC layer 408. The hardmask layer 410 may comprise chromium or SiO$_2$ and may be deposited by sputtering to a thickness of between about 5 nm and about 10 nm.

As shown in FIG. 4B, the hardmask layer 410 is turned into a hardmask 412. The fabrication of the hardmask 412 will be discussed below with regards to FIGS. 5A-5F and 6A-6G. A second DLC layer 413 of between 5 nm and 20 nm is then deposited over the hard mask 412 to protect the outer edges of the sensors in subsequent etching steps as shown in FIG. 4C. A photomask 414 is then formed over the second DLC layer 413 as shown in FIG. 4D. The photomask 414 and exposed second DLC layer 413 effectively shield exposed portions of the DLC layer 408 which is then etched along with the second DLC layer 413 and optionally the top lead 406, using a RIE process, after which the photomask 414 is removed as shown in FIG. 4E. Ion milling is then performed to remove the lead material (if not removed by RIE), the exposed capping layer 404 and sensor 302 are then milled to expose the oxide barrier 306 as shown in FIG. 4F. It is contemplated that the milling may alternatively remove all of sensor 302 to expose the bottom shield S1.

Another photomask 416 is then formed over the exposed DLC layers 413 and 408 and spacer 306 as shown in FIG. 4G. The photomask 416 and hardmask 412 then form a mask while the exposed DLC layers 413 and 408 and optionally the top lead 406 are etched using a RIE process to expose the capping layer 404 as shown in FIG. 4H. Then, ion milling is performed using DLC 408 to prevent milling of layers thereunder from being milled. The exposed portions not covered by DLC layer 408 are milled down to the spacer layer 306 as shown in FIG. 4I, while simultaneously removing the hardmask 412 above DLC layer 408 as shown in FIG. 4J.

Insulating material 418 is then deposited as shown in FIG. 4K. The photomask 416 is then removed as shown in FIG. 4L and another photomask 420 is then formed over the insulating material 418 and some or all of the exposed portions of the DLC layer 408 as shown in FIG. 4M. Insulating material 422, hard or soft bias material 424, an optional capping layer 426 and an optional DLC layer 428 are then formed as shown in FIG. 4N. The photomask 420 is then removed by a lift off process, which removes the layers deposited thereover, as shown in FIG. 4O. A polishing process then occurs, such as a CMP process, to polish down to the DLC layer 408, which acts as a CMP stop layer, as shown in FIG. 4P. Following the CMP process, the exposed DLC layer 408 is then etched using a RIE process to expose the top lead 406 and remaining insulating material 418 as shown in FIG. 4Q. The insulating material 418 is used to isolate the sensors of the side-by-side sensors.

Figure 4T:
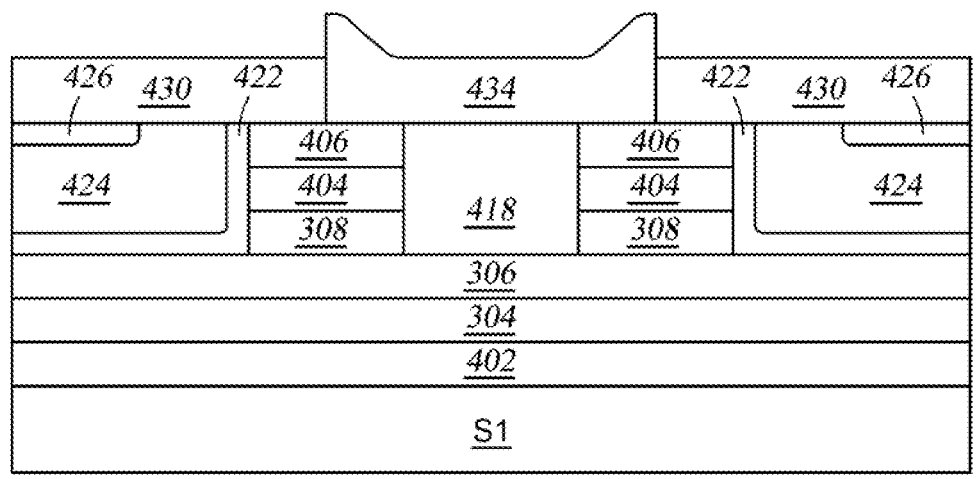

A lead layer 430 is then deposited as shown in FIG. 4R and patterned using a mask 432 as shown in FIG. 4S during an ion milling or RIE process. Additional insulating material 434 is then deposited into the opening after the mask 432 is removed as shown in FIG. 4T. It is to be understood that while the process has been described with defining the outside area (i.e., the area where the insulating material 422, bias material 424 and capping layer 426 are formed) first, defining the inside area (i.e., forming the side-by-side sensors), and then forming the insulating material 422, bias material 424 and capping layer 426, it is contemplated that the inside area can be defined prior to the outside area.

Figure 5A:
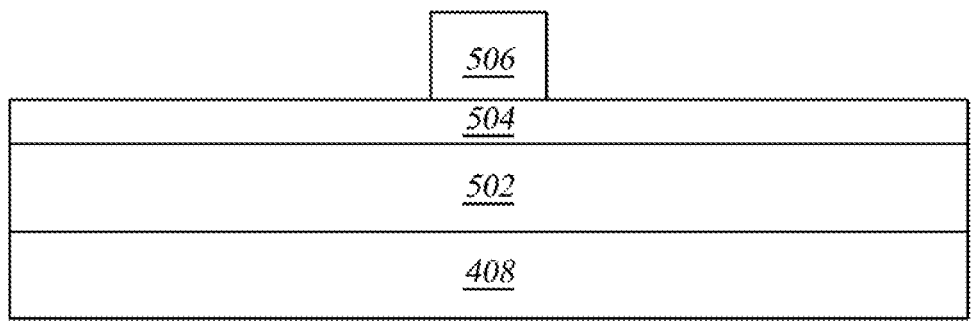
FIGS. 5A-5F illustrate a hardmask for fabricating a read head at various stages of manufacture according to one embodiment.

FIGS. 5A-5F illustrate a hardmask 412 for fabricating a read head at various stages of manufacture according to one embodiment. The process begins by forming a hardmask layer 504 over a DLC layer 408 and a polymer based image transfer layer 502. The hardmask layer 504 may comprise chromium, silicon, silicon dioxide. In one embodiment, the hardmask layer 504 may comprise Duramide. A photomask 506 is then formed over the hardmask layer 504 as shown in FIG. 5A.

Figure 5B:
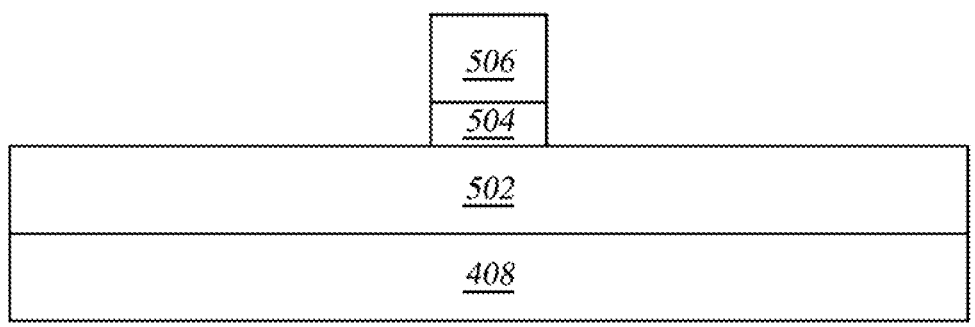

The photomask 506 is then trimmed using RIE to the desired photomask 506 width. As above, trimming may not be necessary if a process with sufficient capability such as immersion lithography is used to define the photomask 506. During the RIE process, the hardmask layer 504 is also etched as shown in FIG. 5B. The remaining hardmask layer 504 and photomask 506 define the spacing between the hardmask 412 to be formed layer.

Figure 5C:
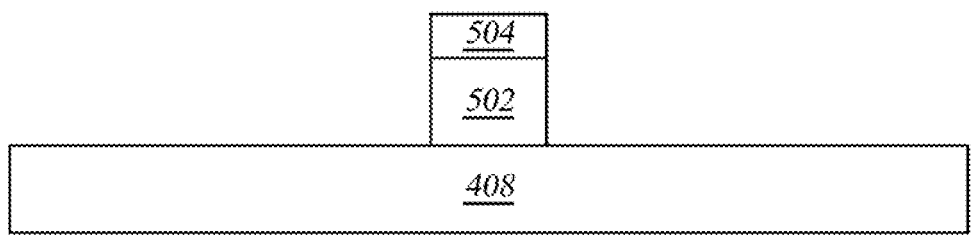
Figure 5D:
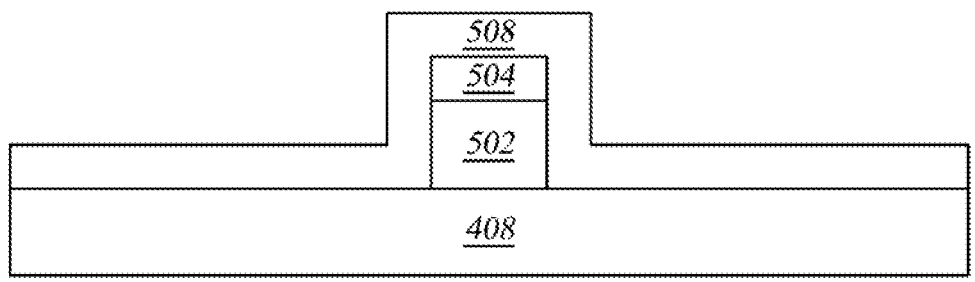

An RIE process is then performed using the remaining hardmask layer 504 and photomask 506 to etch the polymer layer and stop on the DLC layer 408 as shown in FIG. 5C. During the RIE process, the photomask 506 is consumed so that no photomask remains. A thin layer of material 508 that will form the hardmask 412 is then deposited over the hardmask layer 504 and exposed DLC layer 408 as shown in FIG. 5D. In one embodiment, the material 508 comprises chromium.

Figure 5E:
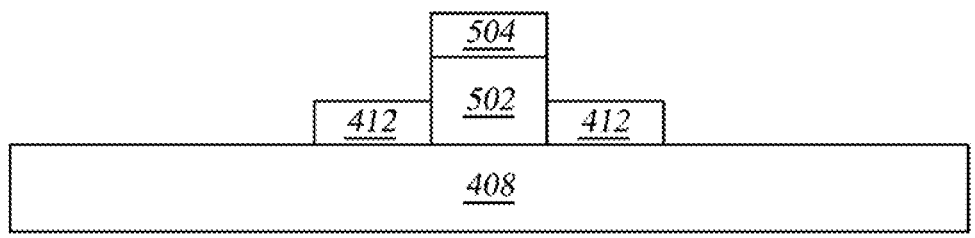

Next, the entire structure is rotated while ion milling occurs at an angle which is neither parallel nor perpendicular to the top surface of the thin layer of material 508. The ion milling angle, combined with the thickness of the remaining image transfer layer 502 determines the length of the region that will be shadowed during the milling process. Due to the shadowing, when the material 508 is fully etched far from the image transfer layer 502, and the hardmask 412 remains on both sides of the image transfer layer 502 as shown in FIG. 5E. Any material 508 that was coated onto the image transfer layer 502 sidewall due to the dispersion in the initial deposition is etched away during the milling.

Figure 5F:
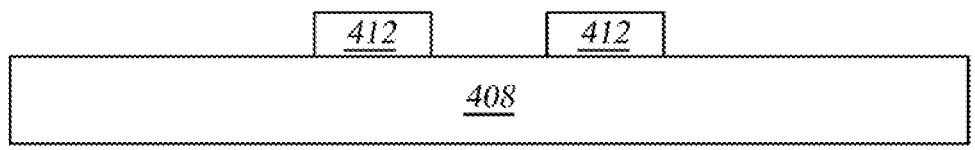

Finally, the hardmask layer 504 and image transfer layer 502 are stripped off in a solvent cleaning step so that the hardmask 412 remains as shown in FIG. 5F. The hardmask 412 comprises two symmetric masks with a gap therebetween that precisely defined by the initial photo/trim steps discussed above. The width of the hardmask 412 is controlled by the thickness of the image transfer layer 502 due to the shadow cast during milling. In this way, the hardmask 412 is created with appropriate dimensions and spacing that are below a photolithographic tool's resolution limit. Thus, expensive, new photolithographic tools are not needed. Following formation of the hardmask 412, formation of the side-by-side sensors may occur as discussed above.

Figure 6A:
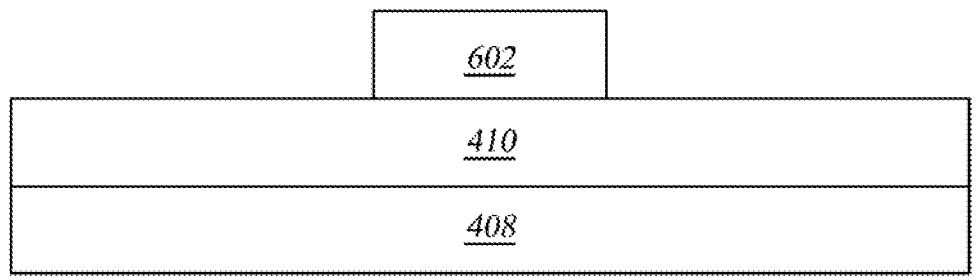
FIGS. 6A-6G illustrate a hardmask for fabricating a read head at various stages of manufacture according to another embodiment.

FIGS. 6A-6G illustrate a hardmask 412 for fabricating a read head at various stages of manufacture according to another embodiment. As shown in FIG. 6A, a photomask 602 is disposed over the DLC layer 408 and hardmask layer 410.

Figure 6B:
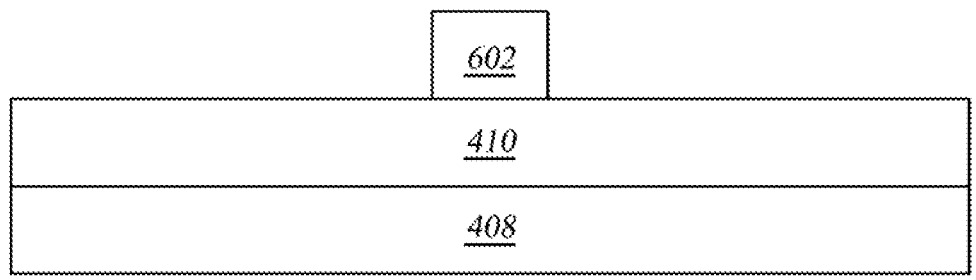

The photomask 602 is then trimmed using a RIE process as shown in FIG. 6B. Trimming may not be necessary if a process with sufficient capability such as immersion lithography is used to define the photomask 602. The width of the photomask 602 after trimming is equal to the spacing between the hardmask 412 that will be formed. The photomask 602 once trimmed may be referred to as a mandrel. It is contemplated that the mandrel can be made of materials other than photo resist and patterned through other means.

Figure 6C:
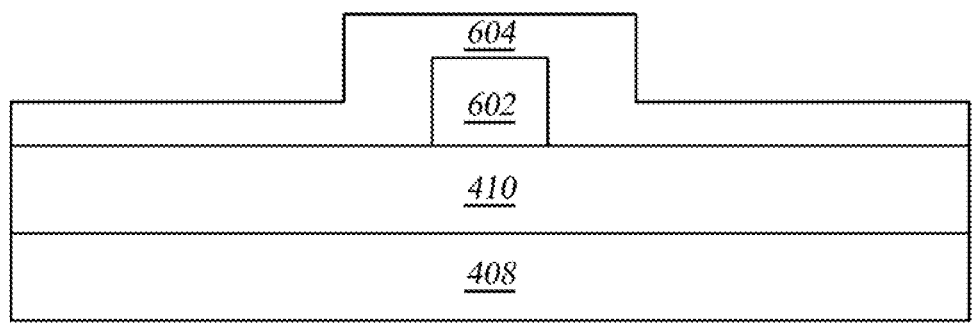

A second masking layer 604 is then deposited over the hardmask layer 410 and the trimmed photomask 602 as shown in FIG. 6C. The trimmed photomask 602 should have a height that is at least two times the thickness of the second masking layer 604 to ensure enough of the masking layer 604 remains after further processing. The second masking layer 604 may comprise silicon oxide, silicon dioxide, tantalum oxide, titanium oxide, chromium or other RIE-able compounds.

Figure 6D:
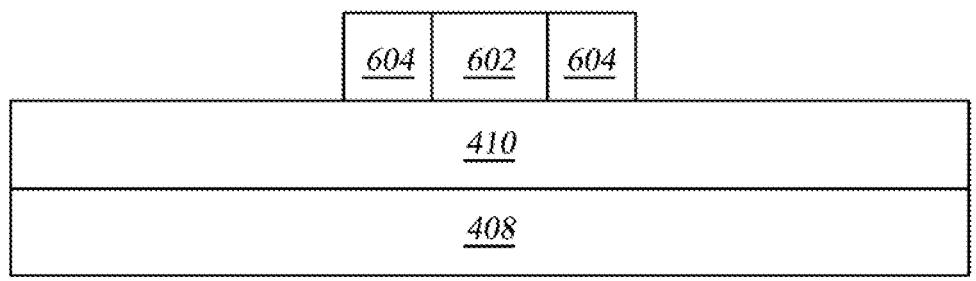
Figure 6E:
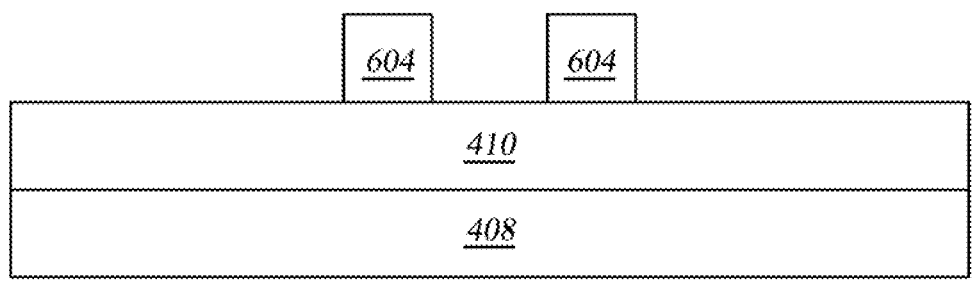

An anisotropic etching process then occurs to remove portions of the second masking layer 604 as shown in FIG. 6D and expose the photomask 602. The photomask 602 is then removed using a RIE process as shown in FIG. 6E.

Figure 6F:
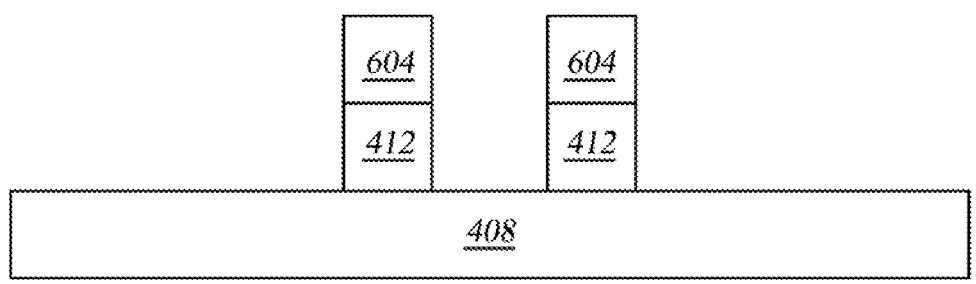
Figure 6G:
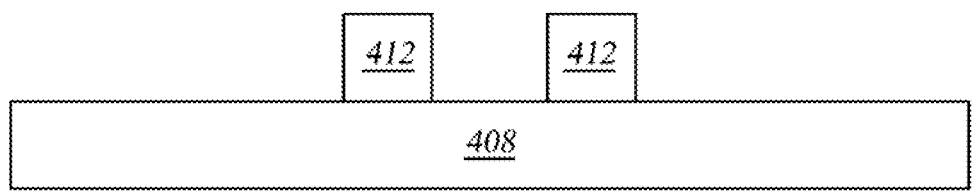

Thereafter, the exposed hardmask layer 410 is etched and a portion of the remaining second masking layer 604 is also removed as shown in FIG. 6F. If any of the second masking layer 604 remains, a CMP process may occur to remove any remaining second masking layer 604 so that the hardmask 412 remains over the DLC layer 408 as shown in FIG. 6G. Following formation of the hardmask 412, formation of the side-by-side sensors may occur as discussed above.

By selecting appropriate materials and etching/milling processes, side-by-side sensors can be formed without the need for new, expensive photolithographic tools. The side-by-side sensors can have a substantially identical trackwidth and a space therebetween that is appropriately centered.

The term DLC is used throughout the patent application. DLC stands for diamond like carbon. It is to be understood that DLC is used therein as an example material for a hard mask or a stopping layer (such as a CMP or RIE stop layer). DLC is used for example purposes only. It is to be understood that the hard mask and the CMP stop layer may comprise materials other than DLC.

While the foregoing is directed to embodiments of the present invention, other and further embodiments of the invention may be devised without departing from the basic scope thereof, and the scope thereof is determined by the claims that follow.

What is claimed is:

1. A MIMO read head, comprising:
   a bottom shield;
   a top shield; and
   side-by-side sensors disposed between the bottom shield and the top shield, wherein the side by side sensors share a first magnetic layer that is disposed on the bottom shield and a barrier layer disposed on the first magnetic layer, wherein each side-by-side sensor comprises a distinct second magnetic layer disposed on the barrier layer, wherein the second magnetic layers have substantially identical dimensions.

2. The MIMO read head of claim 1, wherein the second magnetic layers are spaced apart from each other by an insulating layer.

3. The MIMO read head of claim 2, wherein the top shield comprises a first portion and a second portion insulated from the first portion.

4. The MIMO read head of claim 3, wherein the first portion is disposed on the second magnetic layer of a first sensor of the side-by-side sensors and the second portion is disposed on the second magnetic layer of a second sensor of the side-by-side sensors.

5. The MIMO read head of claim 1, wherein the side-by-side sensors have electrical leads coupled thereto and wherein the electrical leads comprise magnetic material.

6. The MIMO read head of claim 1, wherein the side-by-side sensors are formed by a method comprising:
   forming a sensor above a bottom shield, wherein the sensor comprises a barrier layer between two magnetic layers;
   forming a mandrel over the sensor;
   depositing a spacer layer over the mandrel and sensor;
   reactive ion etching the spacer layer;
   removing the mandrel to expose the sensor; and
   etching the sensor to form side-by-side sensors.

7. The MIMO read head of claim 6, wherein etching the sensor comprises etching through a first layer of the two magnetic layers such that the side-by-side sensors are present.

8. The MIMO read head of claim 7, wherein after etching the first layer of the two magnetic layers, the first layer of the two magnetic layers includes a first portion spaced from a second portion by a distance that is equal to a width of the mandrel.

9. The MIMO read head of claim 8, wherein the first portion and the second portion have substantially identical dimensions.

10. The MIMO read head of claim 9, wherein the dimensions of the first portion and the second portion are equal to dimensions of the spacer layer following the reactive ion etching of the spacer layer.

11. The MIMO read head of claim 6, wherein the side-by-side sensors have electrical leads coupled thereto.

12. The MIMO read head of claim 11, wherein the electrical leads comprise magnetic material.

13. The MIMO read head of claim 1, wherein the side-by-side sensors are formed by a method comprising:
   forming a first photomask over a first hardmask layer, an image transfer layer and a DLC layer;
   reactive ion etching the photomask and first hardmask layer to expose the image transfer layer;
   reactive ion etching the exposed image transfer layer to expose the DLC layer, wherein the reactive ion etching removes the first photomask;
   depositing a second hardmask layer over the exposed DLC layer and the first hardmask layer;
   ion milling the second hardmask layer, wherein the ion milling exposes the first hardmask layer and a portion of the DLC layer; and
   removing the first hardmask layer and the image transfer layer.

14. The MIMO read head of claim 1, wherein the side-by-side sensors are formed by a method comprising:
   forming a hardmask over a DLC layer, a top lead layer, a sensor and a bottom shield,
   depositing a second DLC layer over the first DLC layer and second hard mask layer
   forming a second photomask over the second hardmask and both DLC layers such that a second portion of the DLC layers remains exposed;
   removing the second portion of the DLC layers and the top lead layer and sensor underlying the second portion of the DLC layer to expose the barrier layer;
   depositing a third photomask over the bottom shield and a third portion of the DLC layers, wherein a fourth portion of the DLC layers is exposed between the second hardmask; and removing the fourth portion of the DLC layers, the second hard mask, the top lead layer underlying the fourth portion of the DLC layer, and a portion of the sensor to expose a barrier layer, wherein removing a portion of the sensor creates side-by-side read sensors.

15. A recording system, comprising:
a read head having:
   a bottom shield;
   a top shield; and
   side-by-side sensors disposed between the bottom shield and the top shield, wherein the side by side sensors share a first magnetic layer that is disposed on the bottom shield and a barrier layer disposed on the first magnetic layer, wherein each side-by-side sensor comprises a distinct second magnetic layer disposed on the barrier layer, wherein the second magnetic layers have substantially identical dimensions.

16. The recording system of claim 15, wherein the side-by-side sensors are formed by a method comprising:
   forming a sensor above a bottom shield, wherein the sensor comprises a barrier layer between two magnetic layers;
   forming a mandrel over the sensor;
   depositing a spacer layer over the mandrel and sensor;
   reactive ion etching the spacer layer;
   removing the mandrel to expose the sensor; and
   etching the sensor to form side-by-side sensors.

17. The recording system of claim 15, wherein the side-by-side sensors are formed by a method comprising:
   forming a first photomask over a first hardmask layer, an image transfer layer and a DLC layer;
   reactive ion etching the photomask and first hardmask layer to expose the image transfer layer;
   reactive ion etching the exposed image transfer layer to expose the DLC layer, wherein the reactive ion etching removes the first photomask;
   depositing a second hardmask layer over the exposed DLC layer and the first hardmask layer;
   ion milling the second hardmask layer, wherein the ion milling exposes the first hardmask layer and a portion of the DLC layer; and
   removing the first hardmask layer and the image transfer layer.

18. The recording system of claim 15, wherein the side-by-side sensors are formed by a method comprising:
   forming a hardmask over a DLC layer, a top lead layer, a sensor and a bottom shield,
   depositing a second DLC layer over the first DLC layer and second hard mask layer
   forming a second photomask over the second hardmask and both DLC layers such that a second portion of the DLC layers remains exposed;
   removing the second portion of the DLC layers and the top lead layer and sensor underlying the second portion of the DLC layer to expose the barrier layer;
   depositing a third photomask over the bottom shield and a third portion of the DLC layers, wherein a fourth portion of the DLC layers is exposed between the second hardmask; and
   removing the fourth portion of the DLC layers, the second hard mask, the top lead layer underlying the fourth portion of the DLC layer, and a portion of the sensor to expose a barrier layer, wherein removing a portion of the sensor creates side-by-side read sensors.

19. A hard drive, comprising:
a magnetic media upon which data is written to and read from;
a write head for writing data to the magnetic media; and
a read head for reading data from the magnetic media, the read head having:
   a bottom shield;
   a top shield; and
   side-by-side sensors disposed between the bottom shield and the top shield, wherein the side by side sensors share a first magnetic layer that is disposed on the bottom shield and a barrier layer disposed on the first magnetic layer, wherein each side-by-side sensor comprises a distinct second magnetic layer disposed on the barrier layer, wherein the second magnetic layers have substantially identical dimensions.

20. The hard drive of claim 19, wherein the side-by-side sensors are formed by a method comprising:
   forming a sensor above a bottom shield, wherein the sensor comprises a barrier layer between two magnetic layers;
   forming a mandrel over the sensor;
   depositing a spacer layer over the mandrel and sensor;
   reactive ion etching the spacer layer;
   removing the mandrel to expose the sensor; and
   etching the sensor to form side-by-side sensors.

* * * * *